(12) United States Patent
Park et al.

(10) Patent No.: US 12,381,449 B2
(45) Date of Patent: Aug. 5, 2025

(54) SELF-CHARGING SENSOR MODULE AND ELECTRONIC DEVICE COMPRISING SAME

(71) Applicant: SAMSUNG ELECTRONICS CO., LTD., Suwon-si (KR)

(72) Inventors: Youngjun Park, Suwon-si (KR); Taedong Goh, Suwon-si (KR); Daehyun Kim, Suwon-si (KR); Youngho Ryu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 293 days.

(21) Appl. No.: 18/295,473

(22) Filed: Apr. 4, 2023

(65) Prior Publication Data
US 2023/0246520 A1   Aug. 3, 2023

Related U.S. Application Data

(63) Continuation of application No. PCT/KR2021/015089, filed on Oct. 26, 2021.

(30) Foreign Application Priority Data

Jan. 4, 2021   (KR) ......................... 10-2021-0000286

(51) Int. Cl.
  *H02J 50/00*   (2016.01)
  *G01D 21/00*   (2006.01)
  *H02K 7/18*    (2006.01)
(52) U.S. Cl.
  CPC .......... *H02K 7/1807* (2013.01); *G01D 21/00* (2013.01); *H02J 50/001* (2020.01)
(58) Field of Classification Search
  CPC ...... H02K 7/1807; H02J 50/001; G01D 21/00
  See application file for complete search history.

(56) References Cited

U.S. PATENT DOCUMENTS

| 5,710,474 A | * | 1/1998 | Mulgrave | ............... H02K 29/08 310/85 |
| 8,492,936 B1 | * | 7/2013 | Waters | ................. H02K 7/1876 310/20 |

(Continued)

FOREIGN PATENT DOCUMENTS

| CN | 102674234 A | 9/2012 |
| CN | 112161199 A | 1/2021 |

(Continued)

OTHER PUBLICATIONS

Extended Search Report dated Mar. 26, 2024 in European Patent Application No. 21915464.8.

(Continued)

*Primary Examiner* — Jamel E Williams
(74) *Attorney, Agent, or Firm* — Nixon & Vanderhye, P.C.

(57) ABSTRACT

A sensor module may be mounted in an electronic device including a rotating body rotatably arranged inside a housing. The sensor module may include a stator fixed in the housing; an energy harvester including a rotor mounted in the rotating body, at a position to at least partially face the stator; and a sensor arranged inside the rotating body together with the rotor, wherein, as the rotating body rotates, the rotor may be configured to rotate about the stator and generate an induced current and supply same to the sensor. The sensor may be configured to detect, using power based on the induced current, environmental information of the inside of the rotating body or operating state information of the rotating body.

20 Claims, 6 Drawing Sheets

(56) References Cited

U.S. PATENT DOCUMENTS

| | | |
|---|---|---|
| 2010/0289271 A1 | 11/2010 | DiMauro et al. |
| 2014/0339943 A1* | 11/2014 | Peczalski ............. H02K 15/021 |
| | | 310/113 |
| 2020/0374604 A1* | 11/2020 | Park ........................ D06F 58/06 |
| 2020/0407903 A1* | 12/2020 | Han ........................ D06F 34/06 |

FOREIGN PATENT DOCUMENTS

| | | |
|---|---|---|
| EP | 3490125 A1 | 5/2019 |
| EP | 3 744 969 | 12/2020 |
| JP | 2009-005430 | 1/2009 |
| KR | 20120063937 A | 6/2012 |
| KR | 101365094 B1 | 2/2014 |
| KR | 101440798 B1 | 9/2014 |
| KR | 20150040166 A | 4/2015 |
| KR | 20160141271 A | 12/2016 |
| KR | 20170099115 A | 8/2017 |
| KR | 102085006 B1 | 3/2020 |
| KR | 20200135122 A | 12/2020 |
| WO | 2013159837 A1 | 10/2013 |

OTHER PUBLICATIONS

International Search Report for PCT/KR2021/015089 mailed Feb. 4, 2022, 4 pages.
Written Opinion of the ISA for PCT/KR2021/015089 mailed Feb. 4, 2022, 4 pages.
Office Action dated Apr. 17, 2025 in Korean Patent Application No. 10-2021-000286 and English-language translation.

* cited by examiner

SELF-CHARGING SENSOR MODULE AND ELECTRONIC DEVICE COMPRISING SAME

CROSS-REFERENCE TO RELATED APPLICATIONS

This application is a continuation of International Application No. PCT/KR2021/015089 designating the United States, filed Oct. 26, 2021, and claiming priority to Korean Patent Application No. 10-2021-0000286, filed on Jan. 4, 2021, in the Korean Intellectual Property Office. The entire disclosures of each of these applications are incorporated herein by reference for all purposes.

BACKGROUND

Field

The disclosure relates to an electronic device, for example, an energy harvesting-based self-charging sensor module and/or an electronic device including the same.

Description of Related Art

An electronic device may include an external power supply-based or battery-based sensor module to detect information about an operating environment or an operation state and adjust an operating mode based on the detected information. In a home appliance such as an air conditioner or a refrigerator, for example, a sensor based on a wired power source may detect an indoor or internal temperature to adjust a cooling/heating output, and an imaging device may detect an ambient brightness and output a screen with a suitable brightness. In an example, a cookware may detect a cooking temperature and control heating or non-heating by comparing the cooking temperature with a set temperature. In a home appliance such as an air purifier, a washing machine, a dryer, or a clothes care machine, an operating mode or intensity may be adjusted by detecting an internal temperature and air or water quality.

SUMMARY

It may be difficult to detect the washing state or cleanliness state of laundry or clothes in real time in a home appliance having a rotation tub structure, such as a washing machine or a dryer. For example, while the washing state or cleanliness state of laundry may be detected with high accuracy inside a washing tub or drying tub, it may be difficult to secure an electric wiring capable of providing power or a control signal to a sensor disposed inside a rotation body such as the washing tub or the drying tub.

Various example embodiments of the disclosure may provide a sensor module (including, e.g., a sensor) capable of detecting information about an environment or operation state inside a rotation body without a separate electric wiring by including an energy harvester, and/or an electronic device including the same.

A sensor module according to various example embodiments may be mounted in an electronic device including a rotation body rotatably disposed inside a housing, and include an energy harvester including a stator fixed inside the housing and a rotor mounted on the rotation body at a position at least partially facing the stator, and a sensor disposed together with the rotor inside the rotation body. The rotor may be configured to, as the rotation body rotates, generate an induced current and supply the induced current to the sensor, while rotating with respect to the stator. The sensor may be configured to detect internal environmental information of the rotation body or operation state information of the rotation body using power based on the induced current.

According to various example embodiments of the disclosure, an electronic device may include a housing, a rotator rotatably disposed inside the housing, and a sensor module configured to detect internal environmental information of the rotation body or operation state information of the rotation body. The sensor module may include an energy harvester including a stator fixed inside the housing and a rotor mounted on the rotation body at a position at least partially facing the stator, and a sensor disposed together with the rotor inside the rotation body. The rotor may be configured to, as the rotation body rotates, generate an induced current and supply the induced current to the sensor, while rotating with respect to the stator. The sensor may be configured to detect the internal environmental information of the rotation body or the operation state information of the rotation body using power based on the induced current.

According to various example embodiments of the disclosure, because a sensor module includes an energy harvester, the sensor module may detect information about an ambient environment or information about an operation state even without separately receiving power. In an electronic device including a rotation body such as a washing machine or drying tub, for example, information about an internal environment of the rotation body or information about the operation state of the rotation body may be detected. The electronic device may adjust an operating mode or an operating intensity based on information obtained through the sensor module. In addition, various effects identified directly or indirectly through this disclosure may be provided.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION

Figure 1:
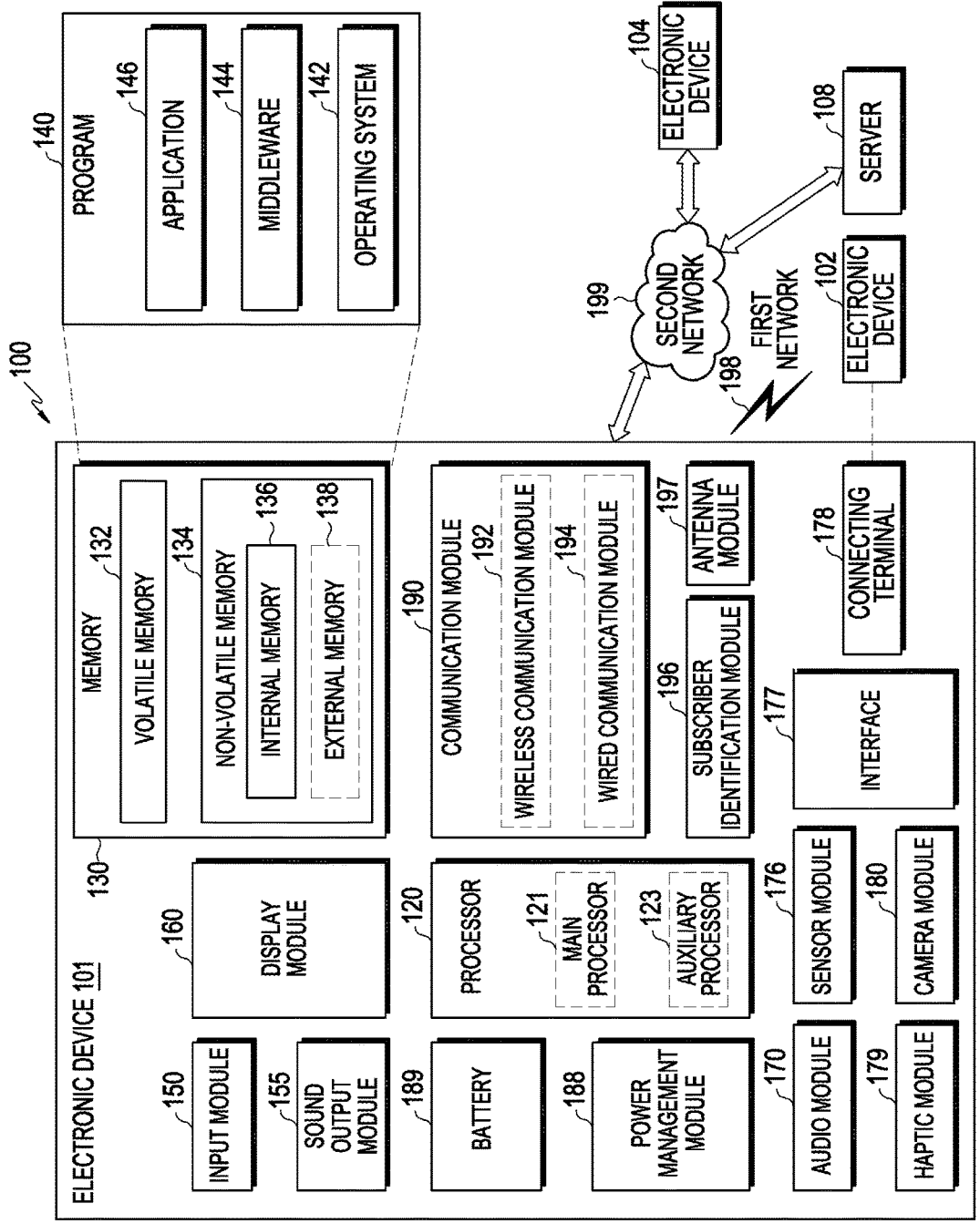
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network, or a combination of two or more thereof, but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of or including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., internal memory or external memory) that is readable by a machine (e.g., an electronic device). For example, a processor (e.g., the processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term 'non-transitory' refers to the storage medium being a tangible device, and does not include a signal (e.g., an electromagnetic wave), but this term does not differentiate between data being semi-permanently stored in the storage medium and the data being temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
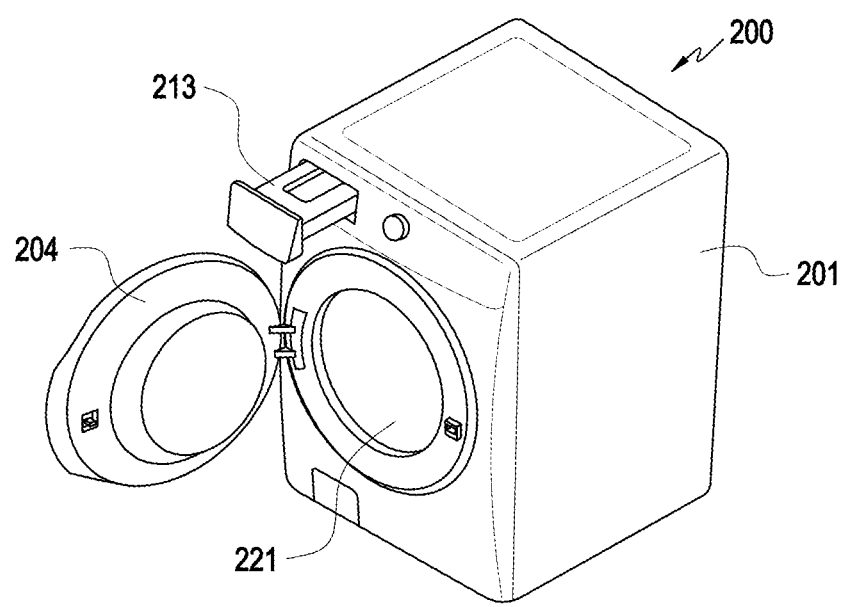
FIG. 2 is a perspective view illustrating an example electronic device according to various embodiments.
Figure 3:
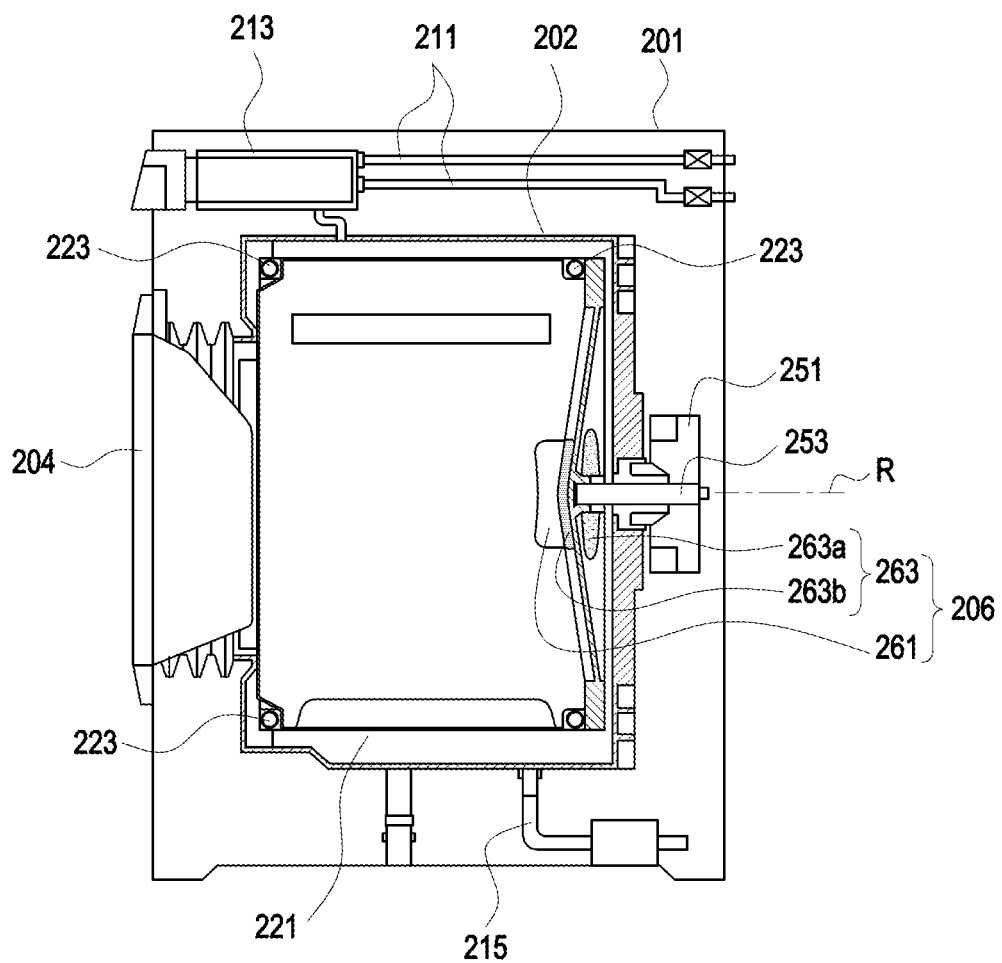
FIG. 3 is a cross-sectional view illustrating an example electronic device including a sensor module according to various embodiments.

FIG. 2 is a perspective view illustrating an example electronic device 200 (e.g., the electronic devices 101, 102, and 104 of FIG. 1) according to various embodiments. FIG. 3 is a cross-sectional view illustrating the example electronic device 200 including a sensor module 206 (e.g., the sensor module 176 of FIG. 1) according to various embodiments.

Referring to FIGS. 2 and 3, the electronic device 200, for example, as a washing machine, may include a housing 201 forming an exterior, a rotation body 221 (e.g., a washing tub) disposed inside the housing 201, and/or the sensor module 206 configured to detect internal environmental information or operation state information of the rotation body 221. Although a washing machine is used as an example electronic device 200 in this embodiment, it should be noted that various embodiments of the disclosure are not limited thereto. For example, the electronic device 200 may be any other product or device including a rotation body or a driving body (e.g., a washing tub or drying tub), which rotates or generates a relative displacement with respect to the housing 201 inside the housing 201. In an embodiment, the electronic device 200 may include a home appliance such as a washing machine or a laundry dryer, and a ventilator or ventilation device including a rotating fan.

According to various embodiments, when the electronic device 200 is a washing machine, the housing 201 may further include a water tank 202 containing washing water and a door 204 sealing the inner space of the water tank or the rotation body 221 inside the housing 201. The rotation body 221, for example, a washing tub, may be rotatably disposed inside the water tank 202 and rotate inside the water tank 202, while containing laundry. The electronic device 200 may further include a water supply pipe 211 disposed above the water tank 202, a detergent supply device 213, and/or a drain pipe 215 disposed below the water tank 202 to discharge washing water after a washing cycle is completed. The water supply pipe 211 or the detergent supply device 213 may be disposed above the water tank 202 to supply washing water and detergent to the water tank 202, and the drain pipe 215 may be disposed below the water tank 202 to discharge washing water easily.

According to various embodiments, the electronic device 200 may include a driving motor 251 rotating the rotation body 221 and a driving shaft 253 extending from the driving motor 251 and mounted on the rotation body 221. The driving shaft 253 may be disposed parallel to a rotation axis R of the rotation body 221 and be rotated substantially together with the rotation body 221 around the rotation axis R by the driving motor 251. In an embodiment, the driving motor 251 may rotate the driving shaft 253 and/or the rotation body 221 alternately in forward and reverse directions. For example, the rotation body 221 (e.g., a washing tub) may rotate alternately in the forward and reverse directions during a washing cycle and in either the forward direction or the reverse direction during a spin dry cycle.

Although a reference numeral is not assigned, a spin dry hole or a lifter may be further provided on the circumferential surface of the rotation body 221. The spin dry hole may allow washing water contained in the water tank 202 to flow into the rotation body 221 (e.g., a washing tub) during the washing cycle, and discharge the washing water separated from laundry by centrifugal force to the outside of the rotation body 221 during the spin-dry cycle. The lifter may lift the laundry soaked in water to a certain height during low-speed rotation. The laundry may fall to the bottom of the rotation body 221 by gravity after reaching a specified height.

According to various embodiments, balancers 223 may be provided at both ends of the rotation body 221 in a direction of the rotation axis R. In an environment in which the rotation body 221 rotates at a high speed as in the spin dry cycle, when the center of gravity of the rotation body 221 does not coincide with the rotation axis R or the laundry is unevenly distributed, the rotation body 221 may not maintain dynamic balance. The balancers 223 may stabilize high-speed rotation of the rotation body 221 by suppressing the dynamic imbalance of the rotation body 221.

According to various embodiments, the sensor module 206 may include an energy harvester 263 and a sensor unit 261 (e.g., a sensor 261a of FIG. 4), and use the sensor 261a to detect internal environmental information of the rotation body 221 or operation state information of the rotation body 221. According to an embodiment, the energy harvester 263 may include a stator 263a fixed in the housing 201 and a rotor 263b mounted on the rotation body 221, and the rotor 263b may generate an induced current, while rotating with respect to the stator 263a together with the rotation body 221. For example, at least one magnet (e.g., a magnet 365a of FIG. 5) may be disposed in the stator 263a, and at least one coil 365b may be disposed in the rotor 263b. As the rotation body 221 rotates, the coil 365b may move relative to the magnet 365a, while revolving around the rotation axis R, thereby generating an induced current based on a magnetic field provided by the magnet 365a. An embodiment of the energy harvester 263 will be described in more detail with reference to FIGS. 5, 6, and 7.

According to various embodiments, the sensor unit 261 may be disposed substantially in the rotation body 221, for example, a washing tub (or drying tub) to obtain internal environmental information or operation state information of the rotation body 221. The 'internal environmental information of the rotation body' may, for example, include information about air quality, water quality (e.g., washing water quality), temperature, or humidity. The 'operation state information of the rotation body' may, for example, include information about a rotation speed, an acceleration, or a rotation direction and/or information about a change in internal temperature and humidity. The configuration of the sensor module 206 including the energy harvester 263 and the sensor unit 261 will be further described with reference to FIG. 4.

Figure 4:
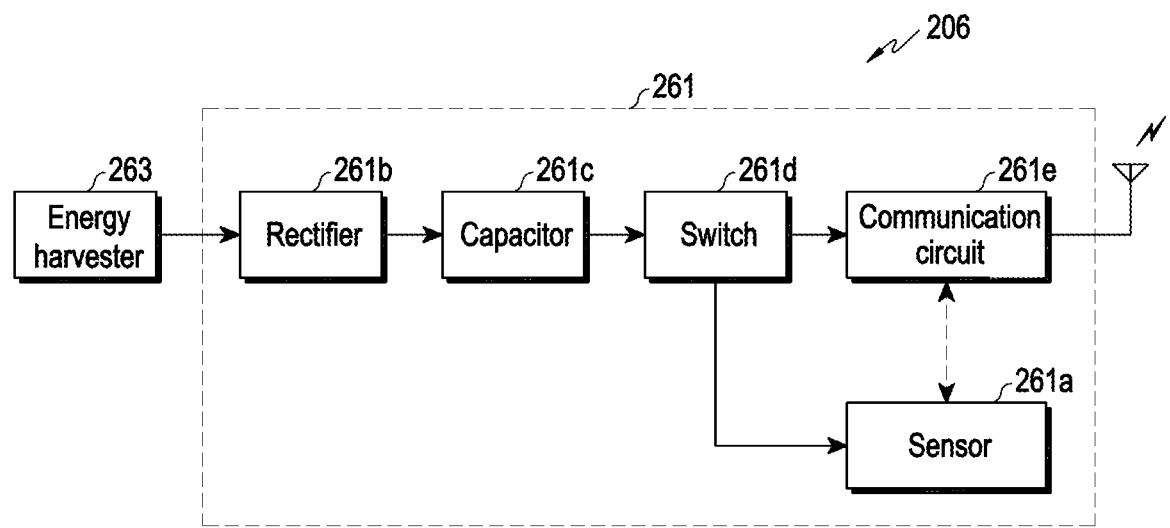
FIG. 4 is a block diagram illustrating an example sensor module according to various embodiments.

FIG. 4 is a block diagram illustrating an example sensor module 206 (e.g., the sensor module 176 of FIG. 1) according to various embodiments.

Referring further to FIG. 4, the sensor module 206 may include the sensor unit 261 and the energy harvester 263, and detect internal environmental information of the rotation body (e.g., the rotation body 221 of FIG. 3) or operation state information of the rotation body 221. In an embodiment, the sensor unit 261 (e.g., the sensor 261a) may receive power based on an induced current to detect the internal environmental information of the rotation body 221 or the operation state information of the rotation body 221. For example, the sensor 261a may include at least one of an air quality sensor, a water quality sensor, a temperature sensor, a humidity sensor, a speed sensor, an acceleration sensor, and/or a location sensor.

According to various embodiments, the sensor unit 261 may further include at least one of a rectifier 261b, a capacitor 261c, a switch 261d, or a communication circuit 261e. The rectifier 261b may be electrically connected to the rotor 263b and, for example, convert an induced current generated in the energy harvester 263 (e.g., the rotor 263b) to be suitable for supply to the sensor 261a. The capacitor 261c may be a storage device that receives and stores power converted by the rectifier 261b, and the sensor 261a may receive the induced current-based power via the rectifier 261b or the capacitor 261c or directly from the harvester 263. While the capacitor 261c is shown as a storage device for storing power in this embodiment, it should be noted that various embodiments of the disclosure are not limited thereto. For example, the storage device may include a rechargeable battery.

According to various embodiments, the switch 261d may selectively supply the power stored in the capacitor 261c to the sensor 261a and/or the communication circuit 261e. The communication circuit 261e may be configured to receive the information detected (e.g., the internal environmental information of the rotation body or the operation state information of the rotation body) through the sensor 261a and transmit the information as a wireless signal to the outside. The transmission of the wireless signal may be performed based on Bluetooth low energy communication. The switch 261d may supply power to at least one of the sensor 261a and/or the communication circuit 261e.

According to various embodiments, the information transmitted through the communication circuit 261e, for example, the internal environmental information of the rotation body or the operation state information of the rotation body may be received by a processor (e.g., the processor 120 of FIG. 1) or a communication module. (e.g., the communication module 190 of FIG. 1), and the electronic device (e.g., the electronic devices 101, 102, 104, and 200 of FIGS. 1 to 3) or the processor 120 may determine the rotation speed of the rotation body 221, the internal temperature of the rotation body 221, or whether water is drained in the water supply based on the information. For example, the operating mode or operation state of the electronic device 200 may be adjusted based on the information detected by the sensor 261a.

The configuration of the energy harvester 263 will be further described with reference to FIG. 5.

Figure 5:
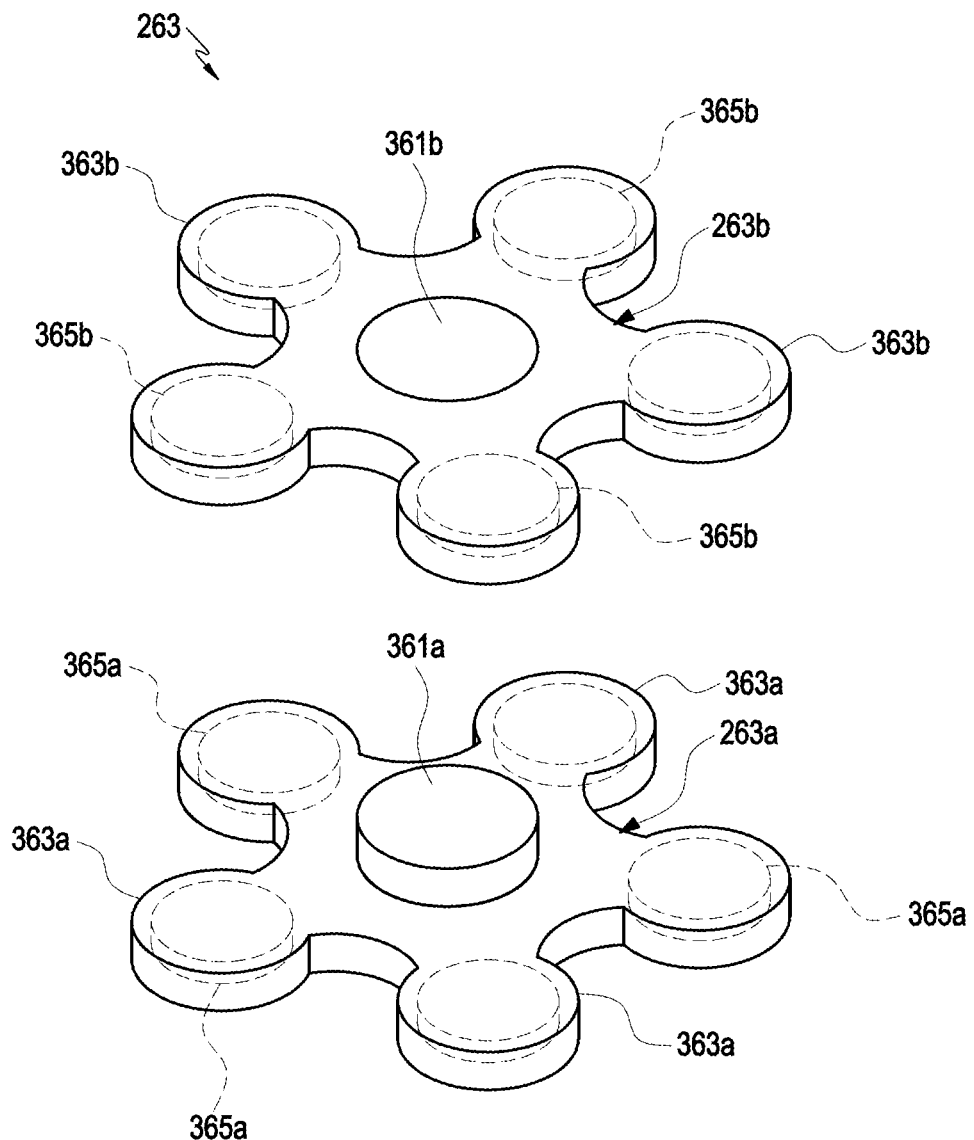
FIG. 5 is an exploded perspective view illustrating an example energy harvester in a sensor module according to various embodiments.

FIG. 5 is an exploded perspective view illustrating an example energy harvester 263 in a sensor module (e.g., the sensor module 206 of FIG. 3 or 4) according to various embodiments.

Referring to FIG. 5, the sensor module 206, for example, the energy harvester 263 may include the stator 263a fixedly disposed in a housing (e.g., the housing 201 of FIG. 3), and the rotor 263b disposed on the rotation body 221 and rotating together with the rotation body 221. The stator 263a may be disposed on a bearing supporting a driving shaft (e.g., the driving shaft 253 of FIG. 3) and remain fixed inside the housing 201. The rotor 263b may be disposed on the rotation body 221 to at least partially face the stator 263a, and rotate together with the rotation body 221 with respect to the housing 201 or the stator 263a.

According to various embodiments, the stator 263a may include a first bearing portion 361a and a plurality of magnets 365a arranged around the first bearing portion 361a along a rotation direction of the rotation body 221. In an example embodiment, the magnets 365a may be arranged at equal angular intervals along the rotation direction of the rotation body 221. The first bearing portion 361a may be part or the whole of the bearing substantially supporting the driving shaft 253. In an example embodiment, the stator 263a may include a plurality of first mounting plates 363a extending in a radial or radius direction from the first bearing portion 361a, and each of the magnets 365a may be disposed on one of the first mounting plates 363a. A substantially odd number of magnets 365a and/or first mounting plates 363a may be arranged.

According to various embodiments, the rotor 263b may include a second bearing portion 361b and a plurality of coils 365b arranged around the second bearing portion 361b along the rotation direction of the rotation body 221. In an example embodiment, the coils 365b may be arranged at equal angular intervals along the rotation direction of the rotation body 221. The second bearing portion 361b may be disposed to rotate together with the rotation body 221 substantially around the rotation axis R. For example, the second bearing portion 361b may be disposed coaxially with the first bearing portion 361a. In an example embodiment, the rotor 263b may include a plurality of second mounting plates 363b extending in a radial or radius direction from the second bearing portion 361b, and each of the coils 365b may be disposed on one of the second mounting plates 363b. A substantially odd number of coils 365b and/or second mounting plates 363b may be arranged.

According to various embodiments, the number of the coils 365b may be substantially the same as that of the magnets 365a, and the shapes of the rotor 263b and the stator 263a may be substantially the same. For example, when the rotor 263b rotates with respect to the stator 263a, the coils 365b may generate an induced current based on a magnetic field provided by the magnets 365a. The number or positions of the magnets 365a and/or the coils 365b may be appropriately selected in consideration of factors such as a specification required for the electronic device (e.g., the electronic devices 101, 102, 104, and 200 of FIGS. 1 to 3) or the rotation speed (e.g., revolutions per minute (rpm)) of the rotation body 221.

According to various embodiments, the induced current may vary depending on the number of windings of a coil 365b, the distance between a magnet 365a and a coil 365b, and/or the rotation speed of the rotation body 221 in the energy harvester 263 having the structure illustrated in FIG. 5. In an embodiment, when the distance between the magnet 365a and the coil 365b and the rotation speed of the rotation body 221 are kept the same, it is identified that an induced current with a voltage of up to 100 mV is generated in the case of one coil 365b with eight turns mounted on one second mounting plate 363b, an induced current with a voltage of up to 200 mV is generated in the case of two coils 365b, and an induced current with a voltage of up to 300 mV is generated in the case of three coils 365b. For example, the voltage of the induced current generated by the energy harvester 263 may be proportional to the number of turns of the coil 365b, the number of coils disposed on one second mounting plate 363b, and the rotation speed of the rotation body 221, and inversely proportional to the distance between the magnet 365a and the coil 365b.

Figure 6:
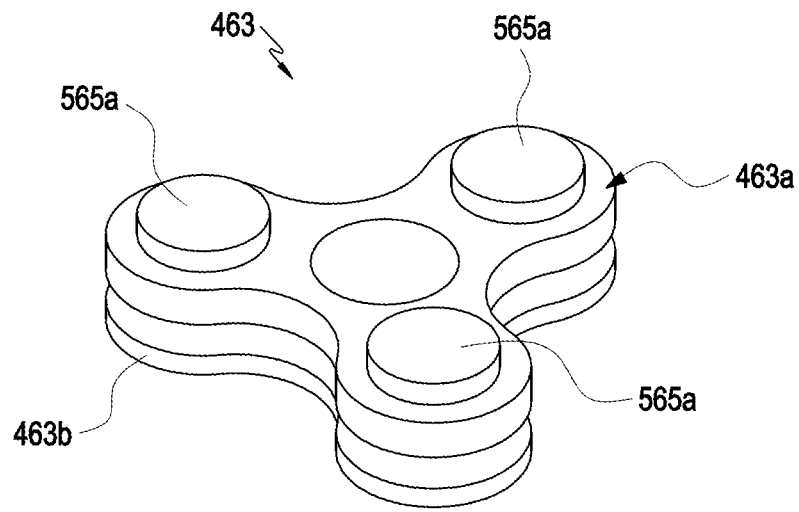
FIG. 6 is a perspective view illustrating an example energy harvester in a sensor module according to various embodiments.

FIG. 6 is a perspective view illustrating another example energy harvester 463 in a sensor module (e.g., the sensor module 206 of FIG. 3 or 4) according to various embodiments.

Referring to FIG. 6, the energy harvester 463 may include a stator 463a and a rotor 463b, and the number of mounting plates 463a and 463b (e.g., the first mounting plates 363a and/or the second mounting plates 363b in FIG. 5), magnets 565a, and/or coils (e.g., the coils 365b of FIG. 5) may vary. For example, five magnets 365a and/or coils 365b may be disposed at approximately 72 degree angular intervals, as illustrated in FIG. 5, and three magnets 565a and/or coils may be disposed at approximately 120 degree angular intervals, as illustrated in FIG. 6. In an example embodiment, the energy harvester 463 (e.g., energy harvester 263 of FIG. 5) may include an odd number of magnets and/or coils, which is not one, and the magnet(s) of the array of the odd number of magnets and/or coils may be fixed by an asymmetric center of gravity or have a low center of gravity, thereby generating a stable induced current.

Figure 7:
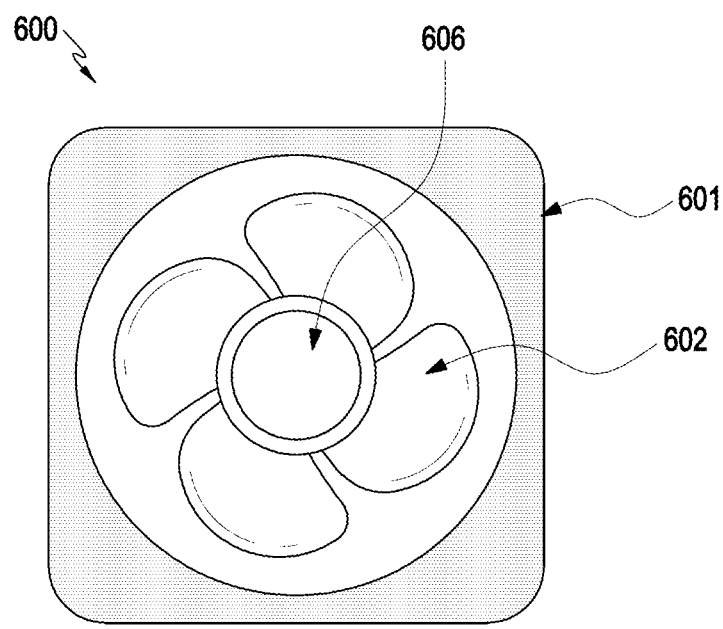
FIG. 7 is a diagram illustrating an example electronic device according to various embodiments.

FIG. 7 is a diagram illustrating an example electronic device 600 (e.g., the electronic devices 101, 102, 104, and 200 of FIGS. 1 to 3) according to various embodiments.

Referring to FIG. 7, the electronic device 600 may be, for example, a ventilation device, a ventilation fan 602 may be disposed in an open area (or space) at the center of a housing 601, and a sensor module 606 may be disposed on a central portion of the ventilation fan 602, for example, on a rotation axis (e.g., the rotation axis R of FIG. 3) of the ventilation fan 602. In an embodiment, the stator 263a and/or the rotor 263b of FIG. 5 may be disposed on the rotation axis of the ventilation fan 602 and rotate relative to each other, so that an induced current is generated through the rotor 263b. The sensor module 606 may detect information such as the quality or temperature of air circulated, discharged, or introduced through the ventilation fan 602, and the electronic device 600 (e.g., the processor 120 of FIG. 1) may adjust the rotation speed of the ventilation fan 602 based on the information detected through the sensor module 606.

As described above, a sensor module (e.g., the sensor module 206 or 606 of FIG. 3, FIG. 4, and/or FIG. 7) according to various embodiments of the disclosure may be mounted in an electronic device (e.g., the electronic device 101, 102, 104, 200, or 600 of FIGS. 1 to 3 and/or FIG. 7) including a rotation body (e.g., the rotation body 221 of FIG. 3 or the ventilation fan 602 of FIG. 7) rotatably disposed inside a housing (e.g., the housing 201 or 601 of FIG. 2, FIG. 3, and/or FIG. 7), and include an energy harvester (e.g., the energy harvesters 263 and 463 of FIGS. 3, 4, 5, and 6) including a stator (e.g., the stator 263a of FIG. 3 and/or FIG. 5) fixed inside the housing and a rotor (e.g., the rotator 263b of FIG. 3 and/or FIG. 5) mounted on the rotation body at a position at least partially facing the stator, and a sensor (e.g., the sensor unit 261 or the sensor 261a of FIG. 2 and/or FIG. 4) disposed together with the rotor inside the rotation body. The rotor may be configured to, as the rotation body rotates, generate an induced current and supply the induced current to the sensor, while rotating with respect to the stator, and the sensor may be configured to detect internal environmental information of the rotation body or operation state information of the rotation body using power based on the induced current.

According to various example embodiments, the sensor may include at least one of an air quality sensor, a water quality sensor, a speed sensor, a location sensor, an acceleration sensor, a temperature sensor, or a humidity sensor.

According to various example embodiments, the sensor module may further include a rectifier (e.g., the rectifier 261b of FIG. 4) electrically connected to the rotor, and a storage device (e.g., the capacitor 261c or the battery of FIG. 4) receiving power through the rectifier and storing the power. The sensor may be configured to receive the power based on the induced current via the rectifier and the capacitor or directly.

According to various example embodiments, the sensor module may further include a communication circuit (e.g., the communication circuit 261e of FIG. 4) configured to receive the environmental information or the operation state information detected through the sensor and transmit the received information to an outside using a wireless signal.

According to various example embodiments, the sensor module may further include a switch (e.g., the switch 261d of FIG. 4) configured to supply the power based on the induced current to at least one of the sensor or the communication circuit.

According to various example embodiments, the stator may include a first bearing portion (e.g., the first bearing portion 361a of FIG. 5) disposed on a rotation axis of the rotation body and a plurality of magnets (e.g., the magnets 365a or 565a of FIG. 5 or FIG. 6) arranged around the first bearing portion along a rotation direction of the rotation body, and the rotor may include a second bearing portion (e.g., the second bearing portion 361b of FIG. 5) fixed to the rotation body and a plurality of coils (e.g., the coils 365b of FIG. 5) arranged around the second bearing portion along the rotation direction of the rotation body.

According to various example embodiments, the coils may be configured to, as the rotation body rotates, generate the induced current based on a magnetic field provided by the magnets.

According to various example embodiments, an odd number of magnets may be arranged at equal angular intervals, and the same number of coils as the magnets may be disposed.

According to various example embodiments, the stator may further include a plurality of first mounting plates (e.g., the first mounting plates 363a of FIG. 5) extending in a radius direction from the first bearing portion, and the magnets may be disposed on any of the first mounting plates.

According to various example embodiments, the rotor may further include a plurality of second mounting plates (e.g., the second mounting plates 363b of FIG. 5) extending in a radius direction from the second bearing portion, and the coils may be disposed on any of the second mounting plates.

According to various example embodiments, an electronic device (e.g., the electronic device 101, 102, 104, 200, or 600 of FIG. 3 and/or FIG. 7) may include a housing (e.g., the housing 201 or 601 of FIG. 2, FIG. 3, and/or FIG. 7), a rotation body (e.g., the rotation body 221 of FIG. 3 or the ventilation fan 602 of FIG. 7) rotatably disposed inside the housing, and a sensor module (e.g., the sensor module 206 or 606 of FIG. 3, FIG. 4, and/or FIG. 7) configured to detect internal environmental information of the rotation body or operation state information of the rotation body. The sensor module may include an energy harvester (e.g., the energy harvesters 263 and 463 of FIGS. 3, 4, 5, and 6) including a stator (e.g., the stator 263a of FIG. 3 and/or FIG. 5) fixed inside the housing and a rotor (e.g., the rotator 263b of FIG. 3 and/or FIG. 5) mounted on the rotation body at a position at least partially facing the stator, and a sensor (e.g., the sensor unit 261 or the sensor 261a of FIG. 2 and/or FIG. 4) disposed together with the rotor inside the rotation body. The rotor may be configured to, as the rotation body rotates, generate an induced current and supply the induced current to the sensor, while rotating with respect to the stator, and the sensor may be configured to detect the internal environmental information of the rotation body or the operation state information of the rotation body using power based on the induced current.

According to various example embodiments, the sensor may include at least one of an air quality sensor, a water quality sensor, a speed sensor, a location sensor, an acceleration sensor, a temperature sensor, or a humidity sensor.

According to various example embodiments, the sensor module may further include a rectifier (e.g., the rectifier 261b of FIG. 4) electrically connected to the rotor, and a storage device (e.g., the capacitor 261c or the battery of FIG.

4) receiving power through the rectifier and storing the power. The sensor may be configured to receive the power based on the induced current via the rectifier and the capacitor or directly.

According to various example embodiments, the sensor module may further include a communication circuit (e.g., the communication circuit 261e of FIG. 4) configured to receive the environmental information or the operation state information detected through the sensor and transmit the received information to an outside using a wireless signal.

According to various example embodiments, the sensor module may further include a switch (e.g., the switch 261d of FIG. 4) configured to supply the power based on the induced current to at least one of the sensor or the communication circuit.

According to various example embodiments, the electronic device may further include a processor or a communication module (e.g., the processor 120 or the communication module 190 of FIG. 1), configured to receive the environmental information or the operation state information transmitted by the communication circuit.

According to various embodiments, the stator may include a first bearing portion (e.g., the first bearing portion 361a of FIG. 5) disposed on a rotation axis of the rotation body and a plurality of magnets (e.g., the magnets 365a or 565a of FIG. 5 or FIG. 6) arranged around the first bearing portion along a rotation direction of the rotation body, and the rotor may include a second bearing portion (e.g., the second bearing portion 361b of FIG. 5) fixed to the rotation body and a plurality of coils (e.g., the coils 365b of FIG. 5) arranged around the second bearing portion along the rotation direction of the rotation body. The coils may be configured to, as the rotation body rotates, generate the induced current based on a magnetic field provided by the magnets.

According to various example embodiments, an odd number of magnets may be arranged at equal angular intervals, and the same number of coils as the magnets may be disposed.

According to various example embodiments, the stator may further include a plurality of first mounting plates (e.g., the first mounting plates 363a of FIG. 5) extending in a radius direction from the first bearing portion, and the magnets may be disposed on any of the first mounting plates. The rotor may further include a plurality of second mounting plates (e.g., the second mounting plates 363b of FIG. 5) extending in a radius direction from the second bearing portion, and the coils may be disposed on any of the second mounting plates.

According to various example embodiments, the rotation body may include any one of a washing tub (e.g., the rotation body 221 of FIG. 3), a drying tub, or a fan (e.g., the ventilation fan 602 of FIG. 7).

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A sensor module for an electronic device including a rotation body rotatably disposed inside a housing, the sensor module comprising:

an energy harvester including a stator fixed inside the housing and a rotor mounted on the rotation body at a position at least partially facing the stator; and a sensor disposed together with the rotor inside the rotation body, wherein the rotor is configured to, as the rotation body rotates, generate an induced current and supply the induced current to the sensor, while rotating with respect to the stator, and wherein the sensor is configured to detect internal environmental information of the rotation body or operation state information of the rotation body using power based on the induced current.

2. The sensor module of claim 1, wherein the sensor includes at least one of an air quality sensor, a water quality sensor, a speed sensor, a location sensor, an acceleration sensor, a temperature sensor, or a humidity sensor.

3. The sensor module of claim 1, further comprising:
a rectifier electrically connected to the rotor; and
a storage device configured to receive power through the rectifier and store the power,
wherein the sensor is configured to receive the power based on the induced current via the rectifier and the storage device or directly.

4. The sensor module of claim 1, further comprising a communication circuit configured to receive the environmental information or the operation state information detected through the sensor and transmit the received information to an outside using a wireless signal.

5. The sensor module of claim 4, further comprising a switch configured to supply the power based on the induced current to at least one of the sensor or the communication circuit.

6. The sensor module of claim 1, wherein the stator includes a first bearing portion disposed on a rotation axis of the rotation body and a plurality of magnets arranged around the first bearing portion along a rotation direction of the rotation body, and
wherein the rotor includes a second bearing portion fixed to the rotation body and a plurality of coils arranged around the second bearing portion along the rotation direction of the rotation body.

7. The sensor module of claim 6, wherein the coils are configured to, as the rotation body rotates, generate the induced current based on a magnetic field provided by the magnets.

8. The sensor module of claim 6, wherein an odd number of magnets are arranged at equal angular intervals, and the same number of coils as the magnets are disposed.

9. The sensor module of claim 6, wherein the stator further includes a plurality of first mounting plates extending in a radius direction from the first bearing portion, and the magnets are disposed on the first mounting plates.

10. The sensor module of claim 6, wherein the rotor further includes a plurality of second mounting plates extending in a radius direction from the second bearing portion, and the coils are disposed on the second mounting plates.

11. An electronic device comprising:
a housing;
a rotation body rotatably disposed inside the housing; and
a sensor module configured to detect internal environmental information of the rotation body or operation state information of the rotation body,
wherein the sensor module comprises:

an energy harvester including a stator fixed inside the housing and a rotor mounted on the rotation body at a position at least partially facing the stator; and a sensor disposed together with the rotor inside the rotation body, wherein the rotor is configured to, as the rotation body rotates, generate an induced current and supply the induced current to the sensor, while rotating with respect to the stator, and wherein the sensor is configured to detect internal environmental information of the rotation body or operation state information of the rotation body using power based on the induced current.

12. The electronic device of claim 11, wherein the sensor includes at least one of an air quality sensor, a water quality sensor, a speed sensor, a location sensor, an acceleration sensor, a temperature sensor, or a humidity sensor.

13. The electronic device of claim 11, further comprising:
a rectifier electrically connected to the rotor; and
a storage device configured to receive power through the rectifier and store the power,
wherein the sensor is configured to receive the power based on the induced current via the rectifier and the storage device or directly.

14. The electronic device of claim 11, further comprising a communication circuit configured to receive the environmental information or the operation state information detected through the sensor and transmit the received information to an outside using a wireless signal.

15. The electronic device of claim 14, further comprising a switch configured to supply the power based on the induced current to at least one of the sensor or the communication circuit.

16. The electronic device of claim 14, further comprising a processor or a communication module, configured to receive the environmental information or the operation state information transmitted by the communication circuit.

17. The electronic device of claim 11, wherein the stator includes a first bearing portion disposed on a rotation axis of the rotation body and a plurality of magnets arranged around the first bearing portion along a rotation direction of the rotation body, wherein the rotor includes a second bearing portion fixed to the rotation body and a plurality of coils arranged around the second bearing portion along the rotation direction of the rotation body, and wherein the coils are configured to, as the rotation body rotates, generate the induced current based on a magnetic field provided by the magnets.

18. The electronic device of claim 17, wherein an odd number of magnets are arranged at equal angular intervals, and the same number of coils as the magnets are disposed.

19. The electronic device of claim 17, wherein the stator further includes a plurality of first mounting plates extending in a radius direction from the first bearing portion, and the magnets are disposed on the first mounting plates, and wherein the rotor further includes a plurality of second mounting plates extending in a radius direction from the second bearing portion, and the coils are disposed on the second mounting plates.

20. The electronic device of claim 11, wherein the rotation body includes any one of a washing tub, a drying tub, or a fan.

* * * * *